(12) United States Patent
Yamane et al.

(10) Patent No.: US 7,734,104 B2
(45) Date of Patent: Jun. 8, 2010

(54) IMAGE CODING APPARATUS, IMAGE DECODING APPARATUS AND IMAGE PROCESSING SYSTEM

(75) Inventors: Kenji Yamane, Tokyo (JP); Michinari Kohno, Tokyo (JP)

(73) Assignee: Sony Computer Entertainment Inc., Tokyo (JP)

( * ) Notice: Subject to any disclaimer, the term of this patent is extended or adjusted under 35 U.S.C. 154(b) by 950 days.

(21) Appl. No.: 11/515,367

(22) Filed: Sep. 1, 2006

(65) Prior Publication Data

US 2007/0121720 A1 May 31, 2007

(30) Foreign Application Priority Data

Nov. 30, 2005 (JP) .............................. 2005-346558

(51) Int. Cl.
G06K 9/36 (2006.01)
(52) U.S. Cl. ..................................... 382/232
(58) Field of Classification Search ................. 382/190, 382/195, 224, 232–233, 236, 239, 305; 348/552–553; 375/240.01, 240.25; 725/143, 153
See application file for complete search history.

(56) References Cited

U.S. PATENT DOCUMENTS

| 5,592,228 | A  | * | 1/1997  | Dachiku et al. | .......... | 348/416.1 |
| 6,252,991 | B1 | * | 6/2001  | Uchio et al.   | ................. | 382/236 |
| 6,665,442 | B2 | * | 12/2003 | Sekiguchi et al. | ........... | 382/224 |

FOREIGN PATENT DOCUMENTS

| JP | 2-44885 | 2/1990 |
| JP | 9-294239 | 11/1997 |
| JP | 10-262229 | 9/1998 |
| JP | 11-177953 | 7/1999 |
| JP | 2002-77240 | 3/2002 |
| JP | 2003-037837 | 2/2003 |
| JP | 2003-153007 | 5/2003 |
| JP | 2003-264790 | 9/2003 |
| JP | 2004-7461 | 1/2004 |
| JP | 2004-304410 | 10/2004 |
| JP | 2005-516557 | 6/2005 |

OTHER PUBLICATIONS

Notification of Reason(s) for Refusal dated Oct. 28, 2008, from the corresponding Japanese Application.
Notification of Reason(s) for Refusal dated Aug. 18, 2009, from the corresponding Japanese Application.

* cited by examiner

Primary Examiner—Jose L Couso
(74) Attorney, Agent, or Firm—Katten Muchin Rosenman LLP (57) ABSTRACT An importance level determination unit receives: input from a camera of frames of moving images taken; input from a switch connected to a server which is operated manually by hand; and voice input from a microphone. Based on these it determines the importance level of each image frame. An encoder compresses and encodes the image frames obtained by the camera and generates moving picture streams. A packetizer packetizes the moving picture streams and gives them to a tag attachment unit. The tag attachment unit attaches the importance level set for the respective image frames to packet headers of the moving picture streams as a priority tag. A transmission unit transmits packets with a priority tag to a network which includes a router with a packet priority control function.

14 Claims, 8 Drawing Sheets

IMAGE CODING APPARATUS, IMAGE DECODING APPARATUS AND IMAGE PROCESSING SYSTEM

BACKGROUND OF THE INVENTION

1. Field of the Invention

This invention relates to an image coding apparatus for encoding moving picture data, an image decoding apparatus for decoding moving picture data, and an image processing system for transmitting and receiving moving picture streams and regenerating the moving pictures.

2. Description of the Related Art

Transfer of data such as images and voice data through various communication media such as the Internet is becoming increasingly common. Recently, in addition to the download type transmission system that has conventionally been used for data transfer on the Internet, stream type transmission system services are becoming increasingly available.

When transmitting multimedia data, such as video files and voice files by a download type transmission system, a data file is first downloaded from a delivery server to a storage media in a receiving terminal and then played back from the storage media. A file cannot be played back until the transmission of the file is completely finished, so this system is poorly suited for extended-time playback, real-time playback, and the such.

In a stream type transmission system, while data is being transferred from the transmitting side to a receiving terminal, playback processing of the received data is executed in parallel. This system is being used for Internet services such as Internet telephone, remote TV conferencing, and video-on-demand-services.

In a stream type transmission system, for example, an MPEG stream, which has been generated through MPEG compression processing of image data, is stored in IP (Internet Protocol) packets and then they are transmitted through the Internet. The packets are received by communication terminals such as PCs, PDAs, or cellular phones, and in this relation, various applications are being developed and promoted. A technology like this is useful for video on demand, live streaming, and real-time communications like TV conferencing and TV telephoning.

The Internet transfers packets by best-effort delivery. As a result, when the amount of data to be transferred reaches the point where it becomes a burden to the network, the network may fall into an overload status, and this can result in the loss of data due to the discarding of packets. Therefore, in order to ensure network quality over the Internet, a network with a priority function capable of setting priority by packet is proposed which utilizes the router technology DiffServ (Differentiated Services) as a major element.

As an example, DiffServ is realized by the adding of a packet priority control function to a router. In the router, two queues with different priority levels are set up. Packets placed in the high-priority queue are always processed and no packet loss occurs. Packets in the low-priority queue are processed only when the high-priority queue is empty. For example, the bandwidth of a stream to be transferred by the router can be measured and this measurement is used to determine priority. For a packet exceeding 5 Mbps a mark indicating Low is attached to the ToS field or such of the IP packet header, and a mark indicating High is attached to the header of a packet of 5 Mbps or less. In the router, the packets marked with High are placed in the high-priority queue and the packets marked with Low are placed in the low-priority queue. Thus, through packet priority control, a minimum bandwidth of 5 Mbps is ensured for this stream.

In Japanese Patent Laid-Open Publication No. 2003-37837, an apparatus is disclosed, which enables simultaneous viewing of a number of images by using a low-bit-rate compatible codec method, and when a specific image is selected, displays the specific image by using a high-bit-rate compatible codec method.

The Internet treats all packets equally. Because of this, network applications, such as multi-participant-type online conversations using moving pictures experience some problems. If a network becomes congested, since all the moving picture stream packets of participants are treated equally, they are thus lost equally, and the moving picture data of the person who is speaking is also lost. For the above-mentioned DiffServ, while it is possible to set a priority for each packet, no appropriate determination standards have been set in terms of how the priority should be set for moving picture stream packets in a multi-participant-type network application like an online conversation. In addition, even when having a network with a priority control function in which the router does priority control of packets which have been given a priority, some sort of system is necessary at the terminal receiving packets so that the image of the moving picture stream having a priority status is given display priority.

SUMMARY OF THE INVENTION

The present invention has been achieved in view of the foregoing problems. It is thus a general purpose of the present invention to provide a technology that regenerates moving pictures by efficiently doing priority control of moving picture streams when transmitting and receiving the moving picture streams via a network.

To solve the foregoing problems, an image coding apparatus according to one of the embodiments of the present invention comprises: an importance level determination unit which determines, by frame, an importance level of a moving image of a person taken with a camera, based on an amount of a characteristic obtained from a facial image of the person; a coding unit which encodes frames of the moving image; a packetization unit which transforms the frames, which have been encoded, into packets; a tag attachment unit which attaches a priority tag reflecting the importance level to the packet header; and a transmission unit which transmits packets with the priority tag to a network which includes a router with a packet priority control function.

Here, "an amount of a characteristic obtained from a facial image of a person" shall refer to the amount of a characteristic which can be obtained from facial image recognition in terms of, for example, the direction of the person's eyes, mouth movement, or the proportion of face to screen area.

Another embodiment of the present invention provides an image decoding apparatus. This apparatus comprises: a receiving unit which receives multiple moving picture streams that have been divided into packets with a priority tag attached to each header from a network which includes a router with a packet priority control function; a priority determination unit which obtains the priority tag from each header of multiple packets received during a specified period and determines the moving picture stream whose packets have the highest priority tag received during the specified period to be a priority moving picture stream; a decoding unit which decodes each of the multiple moving picture streams and regenerates multiple moving images; and a synthesis unit which synthesizes the multiple moving images so that a moving image regenerated from the priority moving picture stream is highlighted when it is displayed.

Yet another embodiment of the present invention provides an image processing system in which an image decoding apparatus is connected to multiple image coding apparatuses via a network. Each of the multiple image coding apparatuses comprises: an importance level determination unit which determines, by frame, an importance level of a moving image taken with a camera; a coding unit which encodes frames of the moving image; a packetization unit which transforms the frames, which have been encoded, into packets; a tag attachment unit which attaches a priority tag reflecting the importance level to the packet header; and a transmission unit, which transmits packets with the priority tag to a network which includes a router with a packet priority control function. The image decoding apparatus comprises: a receiving unit which receives moving picture streams that have been divided into packets with the priority tag attached to each header from each of the multiple image coding apparatuses via the network; a priority determination unit which obtains the priority tag from each header of multiple packets received during a specified period and determines the moving picture stream whose packets have the highest priority tag received during the specified period to be a priority moving picture stream; a decoding unit which decodes each of the moving picture streams from the multiple image coding apparatuses and regenerates multiple moving images; and a synthesis unit which synthesizes the multiple moving images so that a moving image regenerated from the priority moving picture stream is highlighted when it is displayed.

It should be appreciated that any combinations of the foregoing components, and any conversions of expressions of the present invention from/into methods, apparatuses, systems, computer programs, data structures, storage media, and the like are also intended to constitute applicable embodiments of the present invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

The invention will now be described by reference to the preferred embodiments. This does not intend to limit the scope of the present invention, but to exemplify the invention.

Figure 1:
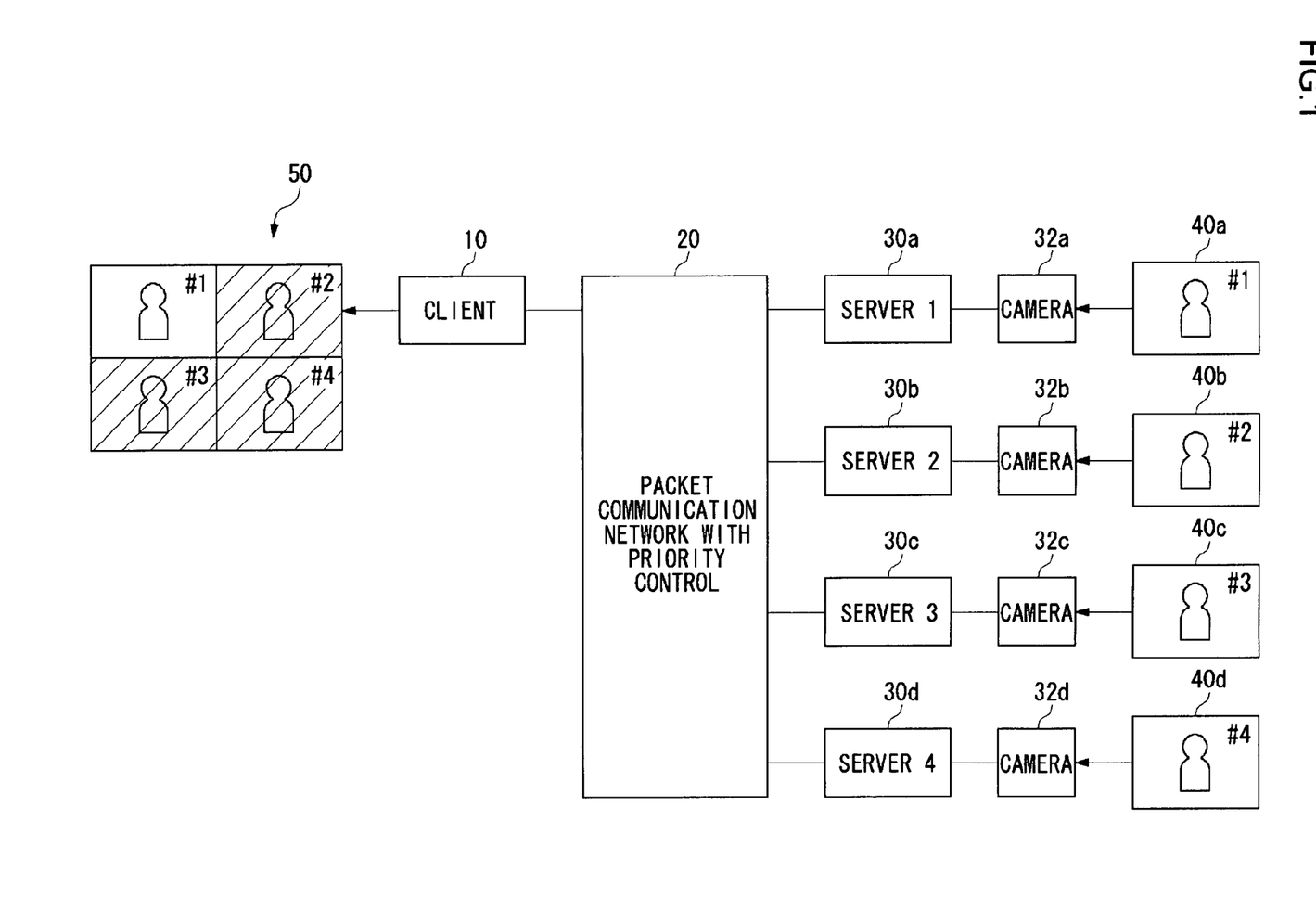
FIG. 1 is a block diagram of an image processing system according to an embodiment.

FIG. 1 is a block diagram of an image processing system according to an embodiment. The image processing system is for implementing a network participative type application such as an online conversation using real-life images. Multiple participants (in this case four persons), take images of themselves with cameras 32a through 32d, respectively, connected to servers 30a through 30d.

The servers 30a through 30d, respectively, compress and encode moving images 40a through 40d, taken respectively, by the cameras 32a through 32d, and generate multiple moving picture streams #1 through #4.

The servers 30a through 30d are connected to a packet communication network with a priority control function (hereinafter simply referred to as "network") 20, and transmit packets of the respective moving picture streams #1 through #4 to a client 10 via the network 20.

The network 20 includes a router with a packet priority control function and transfers packets according to the priority. The router, for example, has the DiffServ specifications, and queues the packets according to their priority. When the network is congested, it gives priority to the high-priority packets and transmits them, and discards the low-priority packets.

The client 10 receives the moving picture streams #1 through #4 from the servers 30a through 30d, respectively, via the network 20, and then decodes the received moving picture streams #1 through #4 to regenerate images. The client 10 synthesizes the images from the servers 30a through 30d and displays them on a screen. The client 10 highlights at least one image among the images from the servers 30a through 30d. For example, in a synthesized image 50, the moving picture stream #1 is a stream to be prioritized for display. By decreasing the brightness of the other moving picture streams #2 through #4, the moving picture stream #1 is relatively enhanced.

Hereinafter, the collective term for the multiple servers 30a through 30d shall be the server 30 and that for the multiple cameras 32a through 32d shall be the camera 32.

Figure 2:
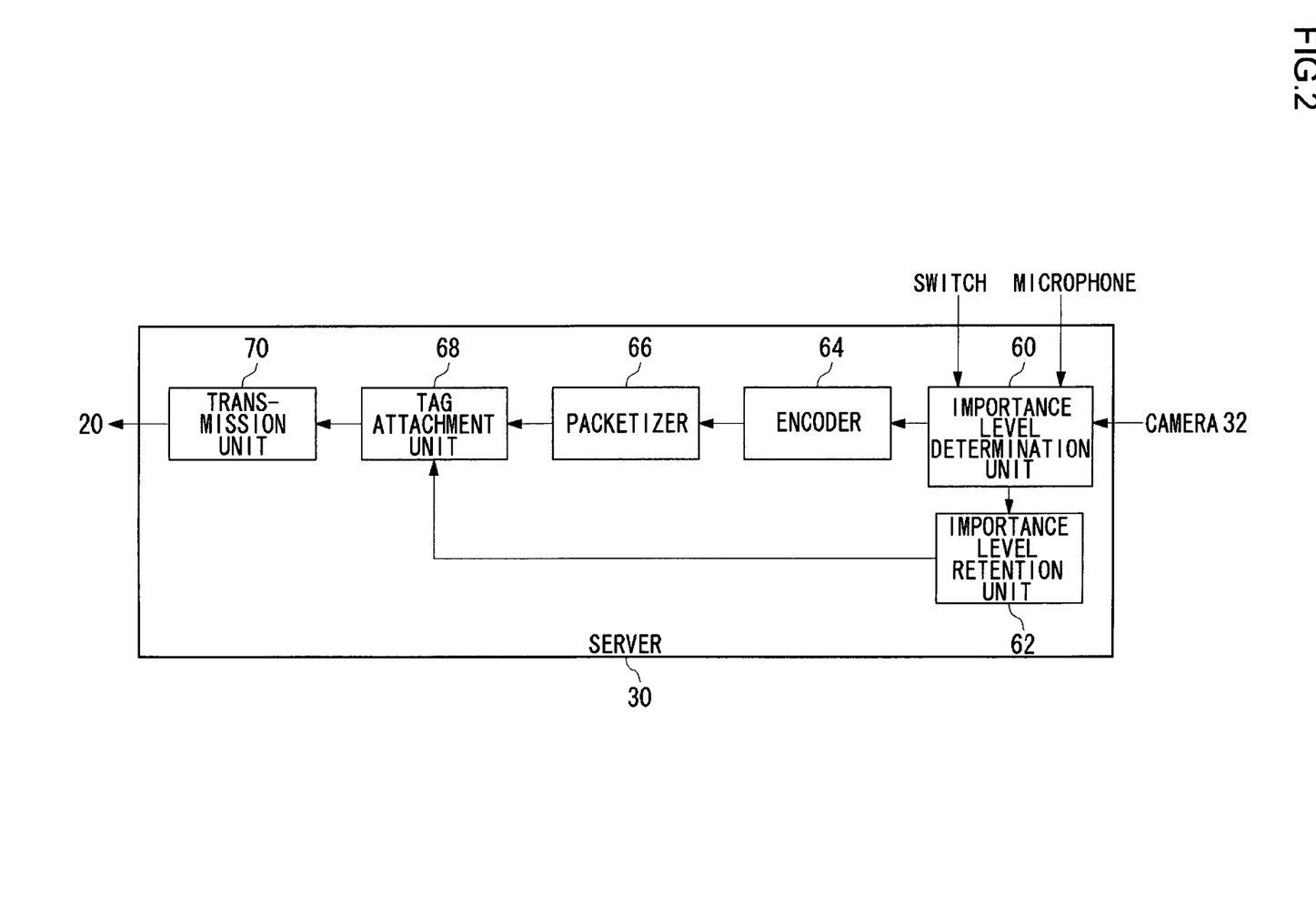
FIG. 2 is a block diagram of the server of FIG. 1.

FIG. 2 is a block diagram of the server 30. The figure shows a block diagram focused on functions. These function blocks may be realized in various forms such as hardware only, software only, or a combination thereof.

The server 30 includes an importance level determination unit 60, an importance retention unit 62, an encoder 64, a packetizer 66, a tag attachment unit 68, and a transmission unit 70.

The importance level determination unit 60 receives: input from the camera 32 of frames of moving images taken; input from input devices connected to the server 30, such as a mouse, a keyboard, a button, or a switch which are operated manually by hand; and voice input from a microphone. Based on these it determines the importance level of each image frame.

The importance level determination unit 60 extracts a facial image of a person within an image frame, and when the eyes of a person are facing the camera or the proportion of the face to the screen is high assigns an importance level of high to the image frame. The importance level determination unit 60 also judges the level of voice input from a microphone. When the level of voice input from a microphone is equal to or higher than a specified threshold level, the judgment is made that a person is talking and an importance level of high is assigned to the image frame.

Furthermore, when an image frame is captured when a participant is operating a switch or such, the importance level determination unit 60 assigns an importance level of high to the image frame. These importance level determination criteria may be used in combination or one of the determination criteria may be given priority. For example, the importance level of an image frame captured when manually operating a switch or such may be set to be higher than normal, even if the eyes are not facing the camera or the voice level is low.

The importance level retention unit 62 retains the importance level of each image frame as determined by the importance level determination unit 60.

The encoder 64 compresses and encodes image frames obtained by the camera 32 and generates moving picture streams. The packetizer 66 packetizes the generated moving picture streams and gives them to the tag attachment unit 68. The tag attachment unit 68 obtains the importance levels set for the respective image frames from the importance level retention unit 62 and attaches the importance level to each packet header of the moving picture streams as a priority tag. Therefore, a high-priority tag is attached to the packet of an image frame with a high importance level. The importance level value may simply be used as the priority tag value or the importance level value may be converted into a priority tag value by a specified conversion equation.

The transmission unit 70 transmits packets with a priority tag to the client 10 via the network 20.

Figure 3:
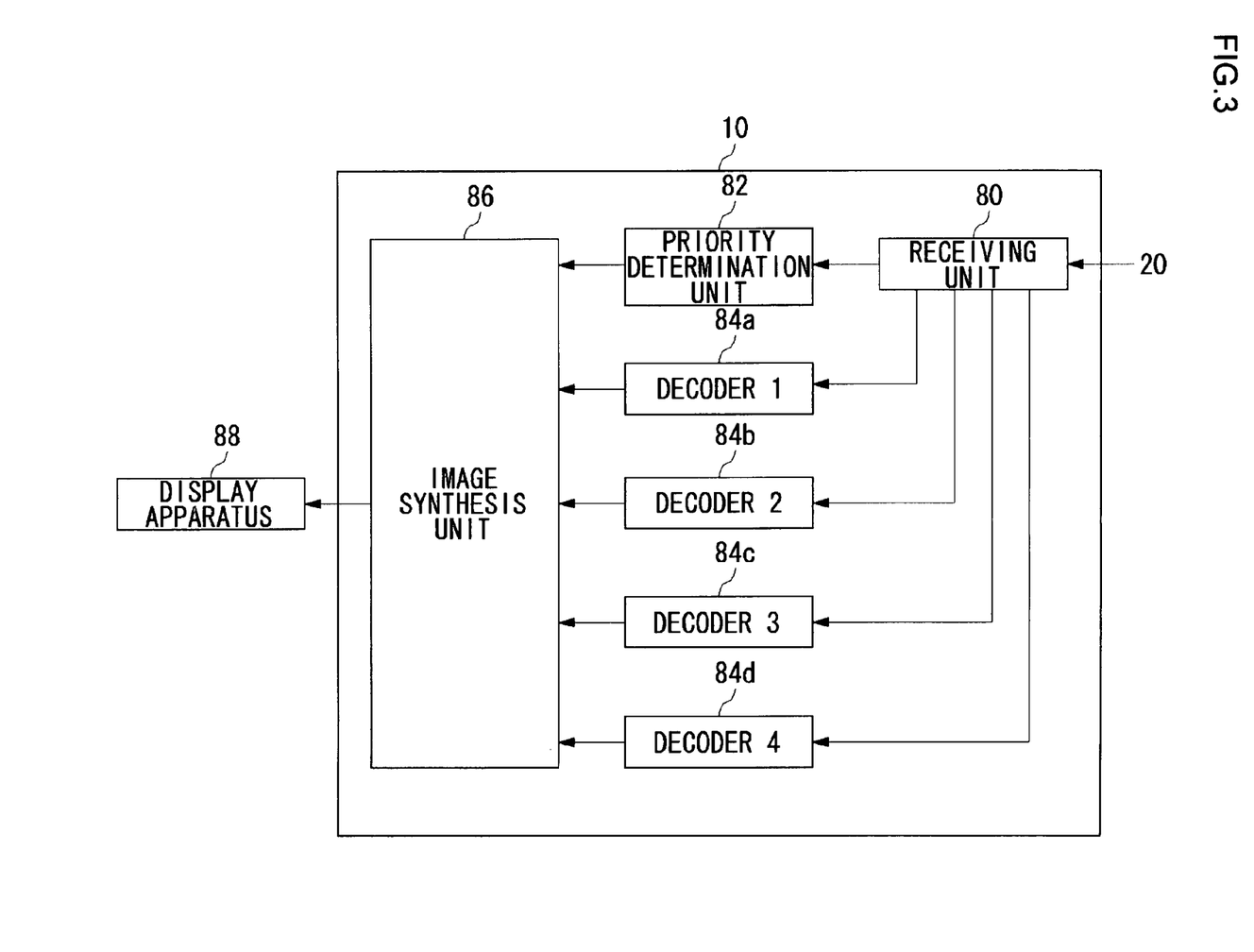
FIG. 3 is block diagram of the client of FIG. 1.

FIG. 3 is a block diagram of the client 10. The figure also shows a block diagram focused on functions. These function blocks may be realized in various forms such as hardware only, software only, or a combination thereof.

The client 10 includes a receiving unit 80, a priority determination unit 82, multiple decoders 84a through 84d, and an image synthesis unit 86. The client 10 is connected to a display apparatus 88.

The receiving unit 80 receives packets of multiple moving picture streams transmitted from the multiple servers 30 via the network 20.

The priority determination unit 82 evaluates the values of the priority tags attached to multiple packets received during a specified period, and selects out the highest priority tag value received during the specified period. The priority determination unit 82 determines the moving picture stream whose packets have the highest priority tag to be the highest priority moving picture stream for that time. The priority determination unit 82 gives the identification number of the highest priority moving picture stream to the image synthesis unit 86.

In addition to determining the highest priority moving picture stream, the priority determination unit 82 may also determine the second and third highest priority moving picture streams, and give the identification numbers of the moving picture streams to the image synthesis unit 86 in order of priority.

The period specified for doing priority determination may be, for example, the time it takes to receive a four frame portion of packets. Setting the period specified for doing priority determination to a short interval of from several tens of milliseconds to several seconds enables the priority determination unit 82 to recognize the priority variation between moving picture streams transmitted from the multiple servers 30 and to determine the high-priority moving picture stream in a short time. In this way, when the image synthesis unit 86 regenerates and displays an image from the high-priority moving picture stream in a highlighted fashion, it can display it with a real-time sensation.

Multiple decoders 84a through 84d are dedicated according to the number of moving picture streams to be received. Here, in accordance with the four servers 30a through 30d, four decoders 84a through 84d are dedicated. The receiving unit 80 inputs the multiple moving picture streams received, respectively, to the decoders 84a through 84d. The decoders 84a through 84d decode each of the moving picture streams, regenerate moving images, and give image data to the image synthesis unit 86.

The respective decoders 84a through 84d may be threads which are each an executable software unit capable of parallel operation. The threads may be scheduled based on the priority. The highest priority may be assigned to the thread corresponding to the first decoder. Meanwhile, a lower priority may be assigned to the second decoder, third decoder, and fourth decoder in descending order. In this case, a setup is made so that the moving picture stream determined to be the highest priority moving picture stream by the priority determination unit 82 is input to the first decoder, and resources are allocated and decoding processing done by priority, accordingly. Also, a setup may be made so that the second, third; and fourth highest priority moving picture streams are input respectively to the second decoder, third decoder, and fourth decoder.

In the event the CPU is in a busy state and unable to decode all the moving picture streams in time for playback due to a computing resource shortage, the scheduler may be set up to process the thread of the decoder to decode the highest priority moving picture stream and suspend processing of the threads of the decoders to decode other moving picture streams. In this way, even when the client 10 is heavily burdened, at least for the highest priority moving picture stream, the necessary computing resources can be obtained for regenerating and displaying an image.

The image synthesis unit 86 receives moving image data decoded by each of the decoders 84a through 84d and synthesizes them to be displayed on the screen. The image synthesis unit 86 having received the identification number of the highest priority moving picture stream from the priority determination unit 82, synthesizes an image of the highest priority moving picture stream with images of other moving picture streams in such a way that the image of the highest priority moving picture stream is highlighted. When the image synthesis unit 86 receives an identification number list showing the order of priority of multiple moving picture streams from the priority determination unit 82, in the image synthesizing of the respective moving picture streams, image enhancement processing may be done in accordance with the assigned priority level.

Figure 4:
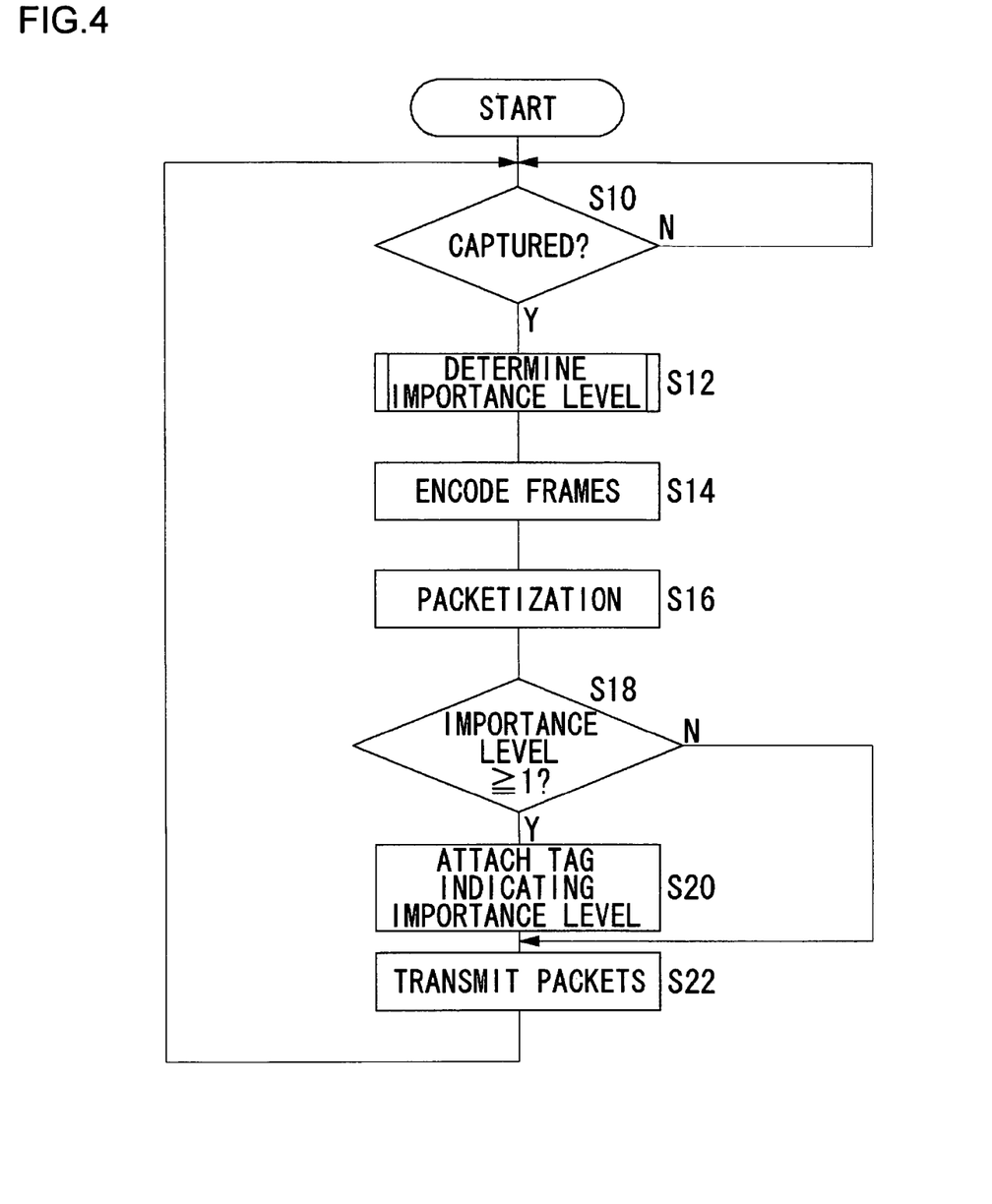
FIG. 4 is a flowchart for explaining the moving picture encoding procedure by the server of FIG. 2.

FIG. 4 is a flowchart for explaining a moving picture encoding procedure by the server 30.

One frame of a moving image is captured by the camera 32 (S10). If a moving image is not captured (N of S10), Step S10 is repeated. The importance level determination unit 60 determines the importance level of the captured frame to be retained in the importance level retention unit 62 (S12).

Figure 5:
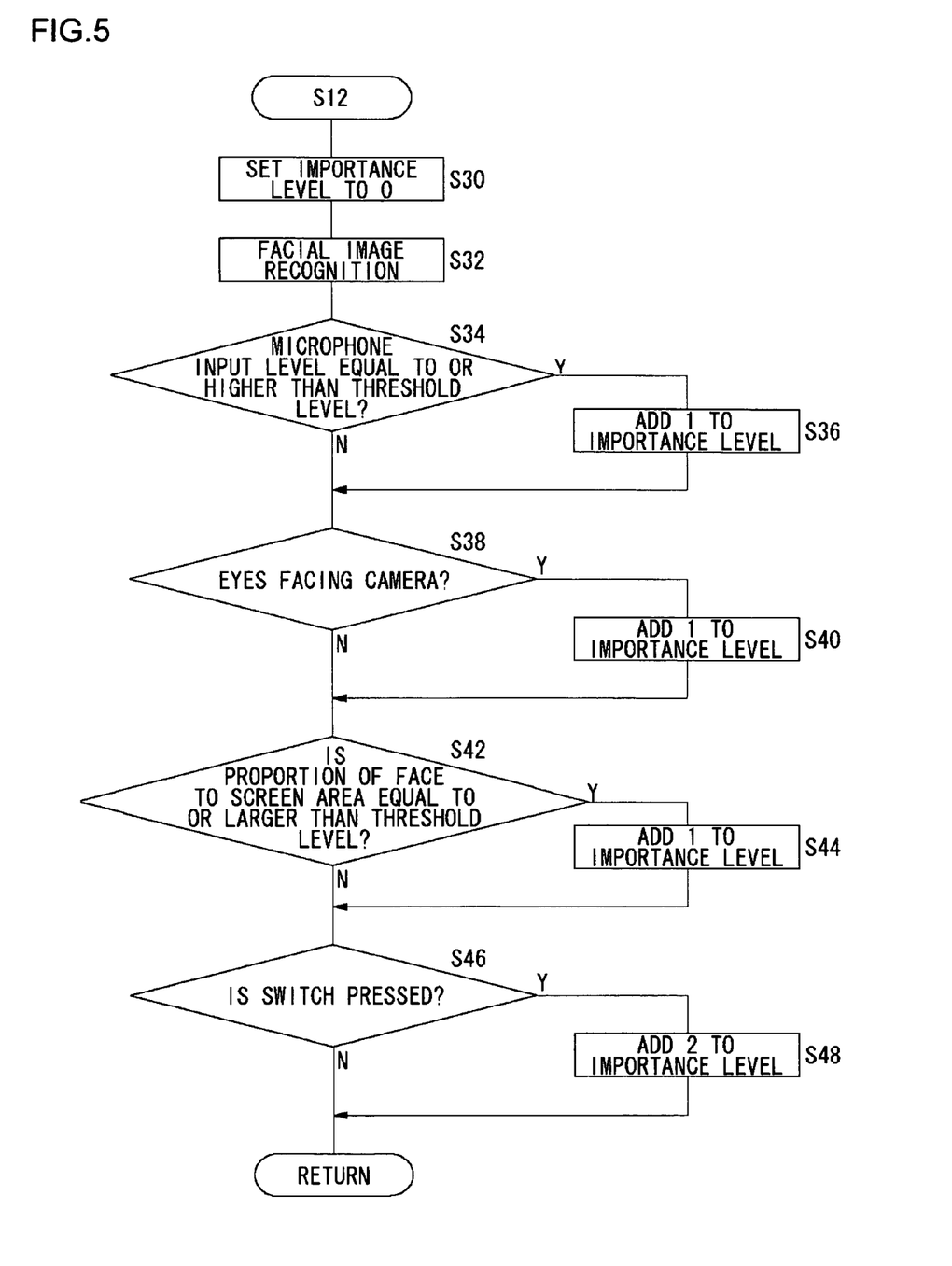
FIG. 5 is a flowchart for explaining the procedure of the importance level determination processing of FIG. 4.

FIG. 5 is a flowchart for explaining in detail Step S12 for importance level determination.

The importance level of each frame is set to zero as the initial value (S30). The facial image of a person within a captured image frame is extracted by using an image recognition algorithm (S32).

When the input level from a microphone is equal to or higher than a specified threshold level (Y of S34), the importance level determination unit 60 adds 1 to the importance level (S36). Meanwhile, when the input level from the microphone is lower than the specified threshold level (N of S34), the importance level determination unit 60 does not change the importance level.

Next, the direction of the eyes is detected from the facial image obtained by image recognition. If the eyes are facing the camera (Y of S38), the importance level determination unit 60 adds 1 to the importance level (S40). If the eyes are not facing the camera (N of S38), the importance level determination unit 60 does not change the importance level.

Further, when the proportion of a face to the screen area is equal to or larger than a specified threshold level (Y of S42), the importance level determination unit 60 adds 1 to the importance level (S44). When the proportion of a face to the screen area is smaller than the specified threshold level (N of S42), the importance level determination unit 60 does not change the importance level.

Furthermore, when a manual switch is pressed (Y of S46), the importance level determination unit 60 adds 2 to the importance level (S48). When a manual switch is not pressed (N of S46), the importance level determination unit 60 does not change the importance level.

Through each of the above-mentioned steps, the importance level determination processing is completed and the process returns to the start. Here, 1 is added to the importance level when the input level from a microphone is high, eyes are facing the camera, or the proportion of a face to the screen area is large. 2 is added to the importance level when a manual switch is pressed. However, the number to be added to the importance level for the respective determination criteria is not limited to these. By appropriately changing the number to be added to the importance level, it is possible to determine the importance level by weighting the multiple determination criteria.

Again, FIG. 4 shall be referenced. The encoder 64 encodes captured frames in accordance with the specifications of JPEG (Joint Photographic Experts Group), JPEG2000, MPEG (Moving Picture Experts Group), MPEG2, MPEG4, or the like (S14).

When encoding a frame by the encoder 64, the encoding parameter may be changed so that the amount to be encoded may be reduced by sacrificing the quality of the image to be regenerated. For example, at Step S12, when the importance level of the frame is determined to be low, the frame rate may be lowered, the number of colors may be reduced, or the resolution may be decreased. In addition, the encoding amount may be held down by cutting the high-frequency component in the hierarchical encoding of JPEG2000. Thus, by reducing the encoding amount of a frame with a low importance level, it is possible to reduce the burden on a network caused by moving picture streams with a low importance level.

The packetizer 66 transforms encoded data into IP packets (S16). When the importance level of a captured frame is equal to or greater than 1 (Y of S18), the tag attachment unit 68 attaches the importance level value retained in the importance level retention unit 62 to a packet header as a priority tag (S20). When the importance level of the captured frame is 0 (N of S18), the priority tag attachment process at Step S20 is skipped.

The transmission unit 70 transmits packets to which a priority tag is attached appropriately (S22). In the router with a packet priority control function included in the network 20, packets with a priority tag are transferred by priority according to the value of the priority tag. There is a possibility that packets without a priority tag will be discarded due to congestion.

Figure 6:
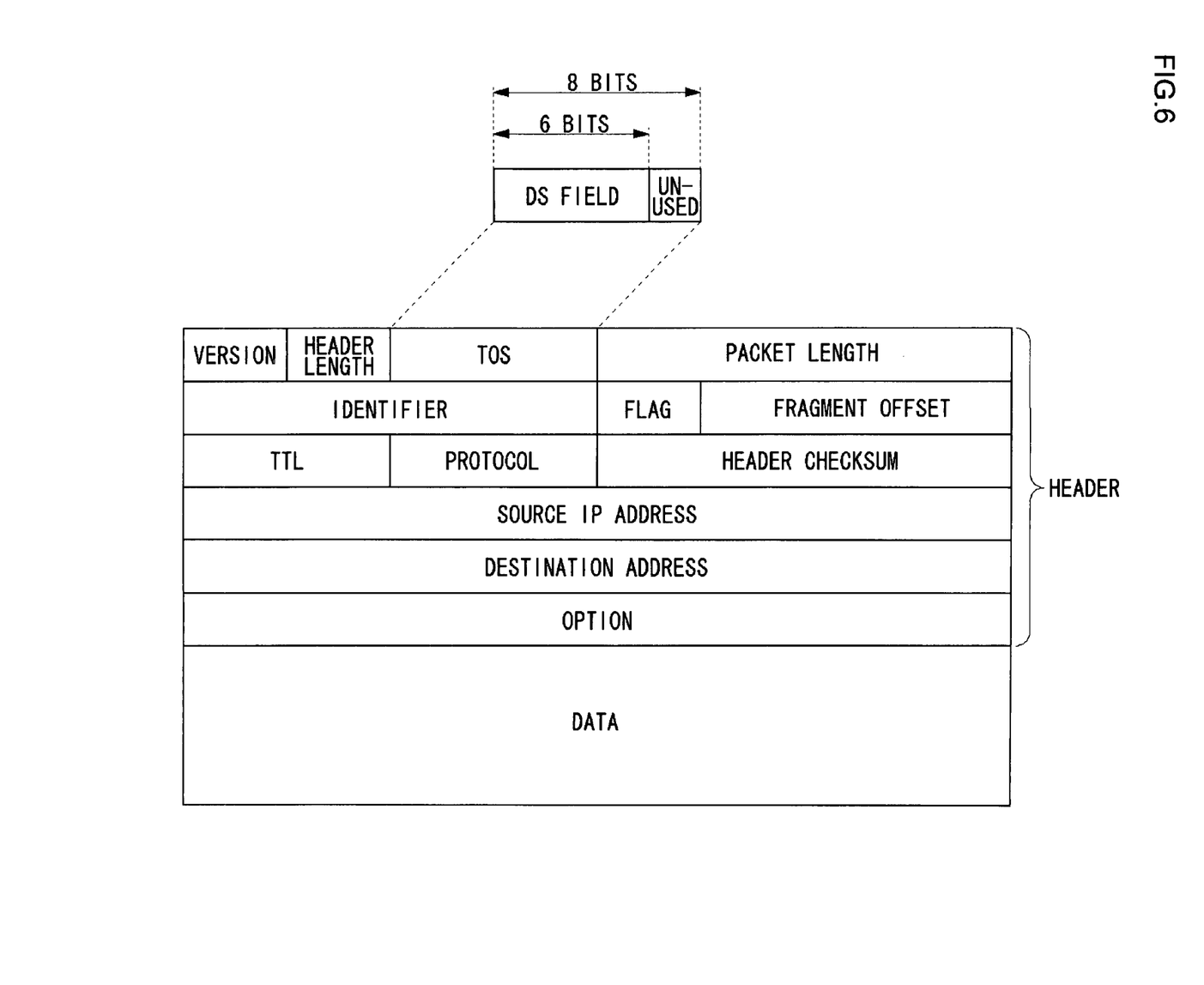
FIG. 6 is a diagram showing the data format of an IP packet.

FIG. 6 shows the data format of an IP packet. An IP packet consists of a header and data. The header includes fields for: version number, header length, TOS (Type of Service), packet length, identifier, flag, fragment offset, TTL (Time To Live), protocol, header checksum, source IP address, destination IP address, and option.

The TOS field consists of 8 bits, of which 6 bits are used for DiffServ as a DS (Differentiated Services) field. In the DS field, a value called DSCP (Differentiated Services Code Point) is set up to determine the priority control action to be done by a DiffServ compatible router and such.

The importance level retention unit 62 writes the priority tag value indicating the importance level in the DS field within the TOS field of the IP header. When the importance level is 0, the TOS field is not changed.

Figure 7:
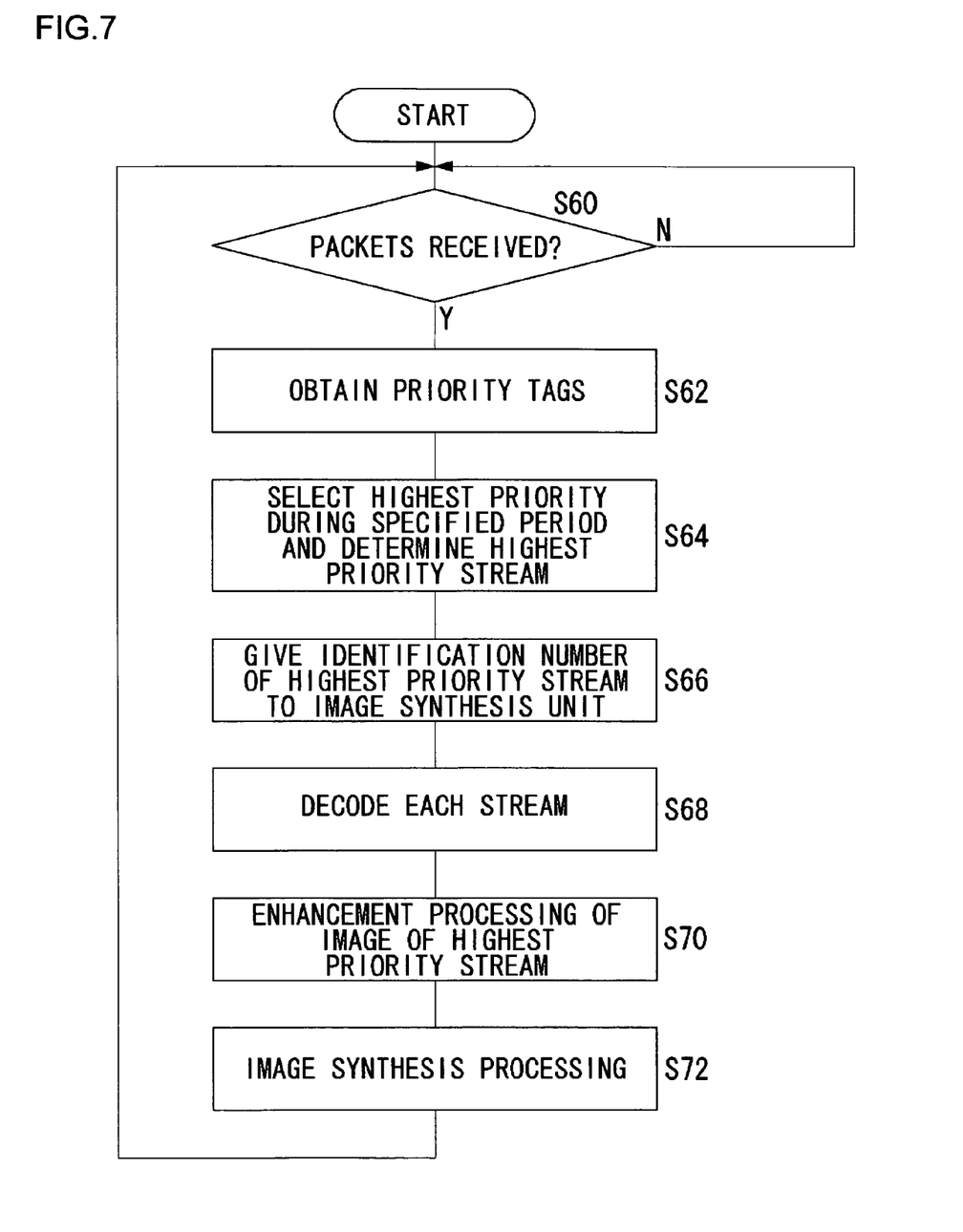
FIG. 7 is a flowchart for explaining the image decoding procedure by the client of FIG. 3.

FIG. 7 is a flowchart for explaining an image decoding procedure by the client 10.

Upon receiving a moving picture stream from one of the servers 30a through 30d via the network 20 (Y of S60), the receiving unit 80 does decoding processing of moving picture streams from that point on. If no moving picture stream is received from any of the servers (N of S60), Step S60 is repeated.

The priority determination unit 82 obtains priority tags from the headers of multiple packets of moving picture streams received within a specified period (S62).

The priority determination unit 82 evaluates the values of the priority tags of the multiple packets received within the specified period, and selects out the one with the highest priority. Then, it determines the moving picture stream whose packets have the highest priority tag to be the highest priority moving picture stream for that time (S64). The priority determination unit 82 gives the identification number of the highest priority moving picture stream to the image synthesis unit 86 (S66).

The multiple decoders 84a through 84d decode the respective streams and regenerate the moving pictures (S68). Based on the identification number of the highest priority moving picture stream obtained from the priority determination unit 82, the image synthesis unit 86 does processing to enhance the image regenerated from the highest priority moving picture stream (S70).

The image synthesis unit 86 synthesizes the image of the highest priority moving picture stream, which has undergone image enhancement processing, with images of other moving picture streams, and then displays the synthesized image on the display apparatus 88 (S72). When the display processing of one frame is completed, the process goes back to Step S60 to start the decoding processing for the next frame.

The following are examples of the image enhancement processing that the image synthesis unit 86 may do on the highest priority moving picture stream: placing the image of the highest priority moving picture stream within a frame or displaying the image of the highest priority moving picture stream in color and displaying the images of other moving picture streams in black and white or with lowered brightness. Also, the image of the highest priority moving picture stream may be placed in the center or displayed with special effects. Further, the display size of the image of the highest priority moving picture stream may be increased or the frame rate may be increased.

Figure 8A:
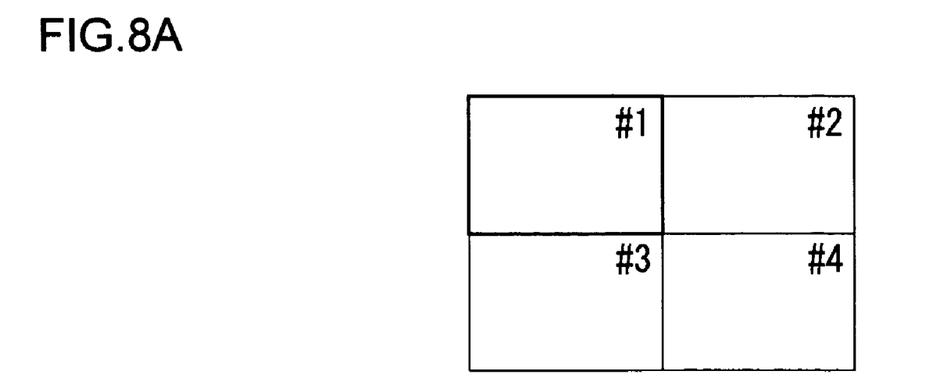
FIG. 8A is a diagram for explaining an example of display enhancement by the image synthesis unit of FIG. 3.
Figure 8B:
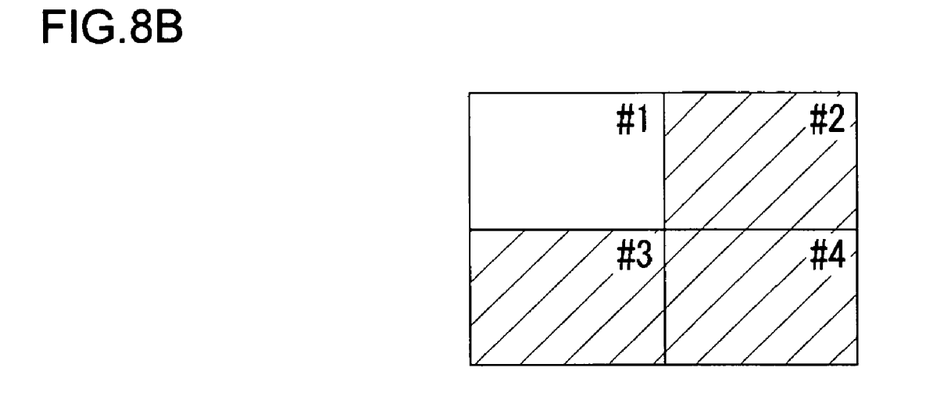
FIG. 8B is a diagram for explaining another example of display enhancement by the image synthesis unit of FIG. 3.
Figure 8C:
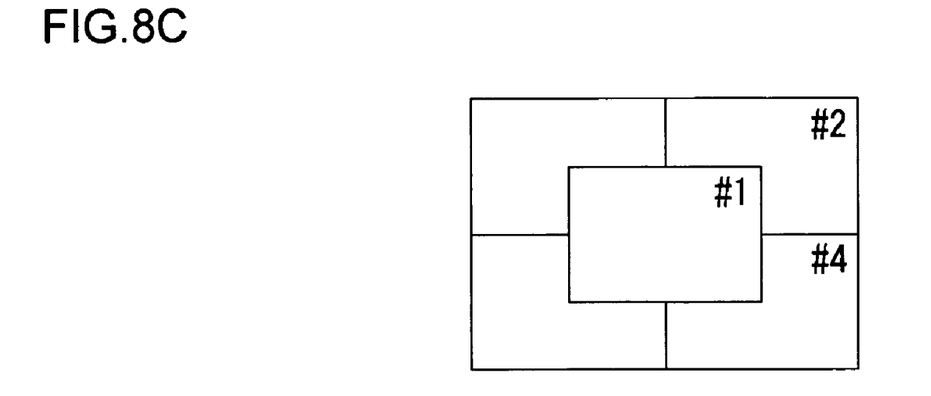
FIG. 8C is a diagram for explaining yet another example of display enhancement by the image synthesis unit of FIG. 3.

FIGS. 8A through 8C are examples of display enhancement by the image synthesis unit 86. FIG. 8A shows an example where the frame of the highest priority moving picture stream #1 is made bolder. FIG. 8B shows an example where the brightness of the streams #2 through #4, which are other than the highest priority moving picture stream #1, are lowered to relatively enhance the highest priority moving picture stream #1. FIG. 8C shows an example where four moving picture streams, #1 through #4, are synthesized in such a way that the highest priority moving picture stream #1 is placed in the center.

As described above, according to the present embodiment, assuming a network 20 has a priority control function such as DiffServ, when encoding and packetizing image frames is done at the server 30, by attaching a priority tag on the packet header of an important frame, packets of frame data of an important stream can reach the client 10 without being discarded in the network. Further, the client 10 can receive the frames of an important stream which has been given priority control in the network 20, and highlight the image of the important stream.

Since the packets of an important moving picture stream to be highlighted by the client 10 are given a priority tag at the server 30 beforehand, they are transferred through the network 20 by priority without being discarded. This ensures that the client 10 receives the packets of an important moving picture stream so it can be regenerated as a high quality image and efficiently highlighted. If a priority tag is not attached, there is a possibility that the packets of the moving picture stream to be highlighted will be discarded in the network 20 at a time of congestion, resulting in the loss of a frame to be highlighted. By attaching a priority tag, such an incident can be avoided. As a result, it is possible to smoothly execute a network application like an online conversation with moving pictures while protecting important moving picture stream data on the network.

Up to this point, the present invention has been described in conjunction with the embodiments thereof. The foregoing embodiments have been given solely by way of illustration. It will be understood by those skilled in the art that various modifications may be made to combinations of the foregoing components and processes, and all such modifications are also intended to fall within the scope of the present invention. Hereinafter, such modifications will be explained.

In the embodiments, an image from a high-priority moving picture stream is highlighted. Meanwhile, a setup may be made so that a high-priority moving picture stream is relatively highlighted through processing that degrades the quality of images of low-priority moving picture streams or images of moving picture streams to which no packet priority tag has been attached from the beginning, by, for example, reducing brightness.

In the embodiments, an explanation was made on the premise of a server/client system. The present invention can also be realized in the same way in a peer-to-peer system.

What is claimed is:

1. An image coding apparatus comprising:
an importance level determination unit which determines, by frame, an importance level of a moving image of a person taken with a camera based on an amount of a characteristic obtained from a facial image of the person;
an encoder which encodes frames of the moving image;
a packetizer which transforms the frames, which have been encoded, into packets;
a tag attachment unit which attaches a priority tag reflecting the importance level to the packet header; and
a transmission unit which transmits packets with the priority tag to a network which includes a router with a packet priority control function.

2. The image coding apparatus according to claim 1, wherein
the importance level determination unit, by also judging the person's voice level as an amount of a characteristic, determines, by frame, an importance level of a moving image of the person.

3. The image coding apparatus according to claim 1, wherein
the importance level determination unit, when the person manually conducts a specified operation, increases the importance level of the frames captured while the operation is being conducted.

4. The image coding apparatus according to claim 2, wherein
the importance level determination unit, when the person manually conducts a specified operation, increases the importance level of the frames captured while the operation is being conducted.

5. An image decoding apparatus comprising:
a receiving unit which receives multiple moving picture streams that have been divided into packets with a priority tag attached to each header from a network which includes a router with a packet priority control function;
a priority determination unit which obtains the priority tag from each header of multiple packets received during a specified period and determines the moving picture stream whose packets have the highest priority tag received during the specified period to be a priority moving picture stream;
a decoder which decodes each of the multiple moving picture streams and regenerates multiple moving images; and
a synthesis unit which synthesizes the multiple moving images so that a moving image regenerated from the priority moving picture stream is highlighted when it is displayed.

6. The image decoding apparatus according to claim 5, wherein the decoder includes multiple threads which are each an executable unit for doing parallel decoding processing of each of the multiple moving picture streams;
the multiple threads are given priority scheduling and receive computing resources; and
a moving picture stream, whose packets have a high-priority tag, is assigned to a high-priority thread and undergoes decoding processing.

7. The image decoding apparatus according to claim 6, wherein
in the event decoding processing of each moving image to be regenerated from each moving picture stream cannot be completed in time for playback, due to a shortage of the computing resources which need to be allocated for decoding processing of the multiple moving picture streams, scheduling is done so that the thread assigned to decoding processing of a moving picture stream, whose packets have a low-priority tag, is suspended and computing resources allocated to the thread are released.

8. An image processing system in which an image decoding apparatus is connected to multiple image coding apparatuses via a network, wherein each of the multiple image coding apparatuses comprises:
an importance level determination unit which determines, by frame, an importance level of a moving image taken with a camera;
an encoder which encodes frames of the moving image;
a packetizer which transforms the frames, which have been encoded, into packets;
a tag attachment unit which attaches a priority tag reflecting the importance level to the packet header; and
a transmission unit, which transmits packets with the priority tag to a network which includes a router with a packet priority control function, and
the image decoding apparatus comprises:
a receiving unit which receives moving picture streams that have been divided into packets with the priority tag attached to each header from each of the multiple image coding apparatuses via the network;
a priority determination unit which obtains the priority tag from each header of multiple packets received during a specified period and determines the moving picture stream whose packets have the highest priority tag received during the specified period to be a priority moving picture stream;
a decoder which decodes each of the moving picture streams from the multiple image coding apparatuses and regenerates multiple moving images; and a synthesis unit which synthesizes the multiple moving images so that a moving image regenerated from the priority moving picture stream is highlighted when it is displayed.

9. The image processing system according to claim 8, wherein
the importance level determination unit which determines, by frame, an importance level of a moving image of a person taken with a camera based on an amount of a characteristic obtained from a facial image of the person.

10. The image processing system according to claim 9, wherein
the importance level determination unit, by also judging the person's voice level as an amount of characteristic, determines, by frame, an importance level of a moving image of the person.

11. The image processing system according to claim 9, wherein
the importance level determination unit, when the person manually conducts a specified operation, increases the importance level of the frames captured while the operation is being conducted.

12. The image processing system according to claim 8, wherein
the decoder includes multiple threads which are each an executable unit for doing parallel decoding processing of each of the moving picture streams from the multiple image coding apparatuses;
the multiple threads are given priority scheduling and receive computing resources; and
a moving picture stream, whose packets have a high-priority tag, is assigned to a high-priority thread and undergoes decoding processing.

13. The image processing system according to claim 12, wherein
in the event decoding processing of each moving image to be regenerated from each moving picture stream cannot be completed in time for playback, due to a shortage of the computing resources which need to be allocated for decoding processing of the multiple moving picture streams from the multiple image coding apparatuses, scheduling is done so that the thread assigned to decoding processing of a moving picture stream whose packets have a low-priority tag is suspended and computing resources allocated to the thread are released.

14. A computer-readable recording medium having stored therein a set of instructions that when executed, cause a computer to perform:
receiving multiple moving picture streams that have been divided into packets with a priority tag attached to each header from a network which includes a router with a packet priority control function;
obtaining the priority tag from each header of multiple packets received during a specified period and determining the moving picture stream whose packets have the highest priority tag received during the specified period to be a priority moving picture stream;
decoding each of the multiple moving picture streams and regenerating multiple moving images; and
synthesizing the multiple moving images so that a moving image regenerated from the priority moving picture stream is highlighted when it is displayed.

* * * * *